US008583831B2

(12) United States Patent
Orady et al.

(10) Patent No.: US 8,583,831 B2
(45) Date of Patent: Nov. 12, 2013

(54) THIN CLIENT DISCOVERY

(75) Inventors: Aly E. Orady, Sunnyvale, CA (US); Nils Bunger, Redwood City, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 305 days.

(21) Appl. No.: 11/973,319

(22) Filed: Oct. 5, 2007

(65) Prior Publication Data

US 2009/0094365 A1    Apr. 9, 2009

(51) Int. Cl.
*H04L 12/46* (2006.01)
*H04L 29/06* (2006.01)

(52) U.S. Cl.
USPC ........... 709/250; 709/226; 709/227; 370/475; 370/476

(58) Field of Classification Search
USPC ........................................................ 719/226
See application file for complete search history.

(56) References Cited

U.S. PATENT DOCUMENTS

| | | | |
|---|---|---|---|
| 6,516,316 B1 | 2/2003 | Ramasubramani | |
| 6,628,663 B1 * | 9/2003 | Cromer et al. | 370/463 |
| 6,854,010 B1 * | 2/2005 | Christian et al. | 709/223 |
| 7,401,114 B1 * | 7/2008 | Block et al. | 709/203 |
| 2003/0061323 A1 | 3/2003 | East et al. | |
| 2003/0145073 A1 * | 7/2003 | Lee | 709/223 |
| 2003/0217166 A1 * | 11/2003 | Dal Canto et al. | 709/229 |
| 2003/0225890 A1 * | 12/2003 | Dunstan et al. | 709/227 |
| 2004/0054698 A1 | 3/2004 | Iwami et al. | |
| 2004/0090970 A1 * | 5/2004 | Sanchez et al. | 370/397 |
| 2004/0210630 A1 * | 10/2004 | Simonnet et al. | 709/203 |
| 2005/0102377 A1 * | 5/2005 | King et al. | 709/219 |
| 2005/0198233 A1 * | 9/2005 | Manchester et al. | 709/221 |
| 2006/0184614 A1 * | 8/2006 | Baratto et al. | 709/203 |
| 2006/0185876 A1 * | 8/2006 | Aviv | 174/50 |
| 2007/0260723 A1 * | 11/2007 | Cohen et al. | 709/223 |
| 2009/0028180 A1 * | 1/2009 | Strater et al. | 370/465 |
| 2009/0129369 A1 * | 5/2009 | Turk | 370/352 |
| 2012/0079368 A1 * | 3/2012 | Abdelaziz et al. | 715/234 |

\* cited by examiner

*Primary Examiner* — Steven H Nguyen
*Assistant Examiner* — Jason Harley
(74) *Attorney, Agent, or Firm* — Sughrue Mion, PLLC

(57) ABSTRACT

A method of assigning a resource to provide services to a thin client is disclosed. The thin client is discovered by receiving a response to a discovery request wherein the response is directed to a broker. The resource to allocate for the thin client is determined. The thin client to the resource is mapped. A connection to the thin client is requested to be established between the resource and the thin client.

27 Claims, 17 Drawing Sheets

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| Ver/ID (0x01) ||||||||  Syn | Ack | Nack | Reset | OOB | Ordered | NoAck | Reserved | SeqNo |||||||||| AckSeq ||||
| AckSeq/OrderID |||||||| Security ||||||||||||||||||||||||
| Payload ||||||||||||||||||||||||||||||||

| Field | Description |
|---|---|
| Ver/ID | Identifies the packet as a TNP Version 1.0 packet. |
| Syn | Synchronize bit used to initiate connections and synchronize sequence numbers. |
| Ack | Acknowledge bit used to acknowledge reception of TNP packets. |
| Nack | Negative Acknowledge bit used to notify the peer of missing packets. |
| Reset | Reset bit used to tear down a connection. |
| OOB | Out-of-band bit used to distinguish connection oriented traffic from connection-less traffic. |
| Ordered | Ordered bit used to maintain loose ordering of out-of-band traffic. |
| NoAck | When set, indicates that this datagram need not be acknowledged. |
| SeqNo | TNP packet sequence number. |
| AckSeqNo/OrderID | Overload field used to hold the sequence number of the packet being acknowledged, or the order ID for Ordered packets. |
| Security | 3-byte security field reserved for carrying authentication and encryption keys and other security information. |
| Payload | When present, encapsulated one or more messages. |

FIG. 2B

| 0 | 1 | 2 | 3 | 4 | 5 | 6 | 7 | 8 | 9 | 1 0 | 1 1 | 1 2 | 1 3 | 1 4 | 1 5 | 1 6 | 1 7 | 1 8 | 1 9 | 2 0 | 2 1 | 2 2 | 2 3 | 2 4 | 2 5 | 2 6 | 2 7 | 2 8 | 2 9 | 3 0 | 3 1 |
|---|---|---|---|---|---|---|---|---|---|---|---|---|---|---|---|---|---|---|---|---|---|---|---|---|---|---|---|---|---|---|---|
| EndPoint | | | | | Length | | | | | | | | | | | Data | | | | | | | | | | | | | | | |
| ... | | | | | | | | | | | | | | | | | | | | | | | | | | | | | | | |
| Data | | | | | | | | | | | | | | | | | | | | | | | | | | | | | | | |
| EndPoint | | | | | Length | | | | | | | | | | | Data | | | | | | | | | | | | | | | |
| Data | | | | | | | | | | | | | | | | | | | | | | | | | | | | | | | |
| ... | | | | | | | | | | | | | | | | | | | | | | | | | | | | | | | |

| Field | Description |
|---|---|
| EndPoint | 5-bit value in the range of 0 to 31 indicates which end-point the message is associated with. |
| Length | Length of the message data field in bytes. Length may be 0. |
| Data | The data being carried by the message. |

FIG. 2C

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| Opcode | | | | Length | | | | Address | | | | | | | | | | | | | | | | | | | | | | | |
| Transaction ID | | | | | | | | | | | | | | | | Data | | | | | | | | | | | | | | | |
| Data | | | | | | | | | | | | | | | | | | | | | | | | | | | | | | | |

| Field | Description |
|---|---|
| OpCode | 4-bit code indicating the type of transaction to be performed. |

| OpCode | Description |
|---|---|
| 0x0 | Configuration Read Request |
| 0x1 | Configuration Write Request |
| 0x2 | Configuration Read Return |
| 0x3 | CSR Read Request |
| 0x4 | CSR Write Request |
| 0x5 | CSR Read Return |
| 0x6 | Interrupt |
| 0x7 | Error |
| 0x8 | Announce |

| Field | Description |
|---|---|
| Length | Length of the transaction in 32-bit words. |
| Address | The word address of the transaction. (Words are 32-bits) |
| Transaction ID | Transaction identifier selected by the host and used to associate responses from the client with the requests initiated by the host. |
| Data | Data associated with the transaction for operations that have data. |

FIG. 3B

| Address (Hex) | Description |
|---|---|
| 0x0000 | Device Class: 32-bit value indicating the class of device. Example of classes include: Video Input, Video Output, Audio Input, Audio Output, USB, Mass Storage, Human Interface, and Composite Device. |
| 0x0001 | Vendor ID: 32-bit value unique to each hardware vendor. |
| 0x0002 | Device ID: Unique 32-bit value assigned by each vendor to each device. (All instances of the same device have the same Device ID) |
| 0x0003 | Device Revision: 32-bit revision code used to identify the device revision. |
| 0x0004 | Capability Structure Pointer: The bottom 24-bits of this 32-bit field indicate the starting address of a capability structure. The upper 8-bits of this 32-bit field indicate the total length in words of the entire capability structure. If this field has a value of 0x0, then there are no capability structures. |

FIG. 3C

| Offset (Hex) | Description |
|---|---|
| 0x0000 | Type: 32-bit value unique to each type of capability structure. |
| 0x0001 | Next Capability Structure Pointer: The bottom 24-bits of this 32-bit field indicate the starting address of a capability structure. The upper 8-bits of this 32-bit field indicate the total length in words of the entire capability structure being pointed to. If this field has a value of 0x0, then there are no more capability structures in the chain. |
| 0x0002 – end | The remaining addresses may be used as desired by the capability structure. |

FIG. 3D

| Offset (Hex) | Description |
| --- | --- |
| 0x0000 | Capability Structure ID (0x002) |
| 0x0001 | Next Capability Structure Pointer |
| 0x0002 | Peer Connected: Indicates if a peer is connected. Read-Only. |
| 0x0003 | Peer Ethernet Address (High): Upper 16-bits of the Ethernet address of the peer a connection is currently established to. Read-Only. |
| 0x0004 | Peer Ethernet Address (Low): Lower 32-bits of the Ethernet address of the peer a connection is currently established to. Read-Only. |
| 0x0005 | Peer IP Address: IP Address of the peer a connection is currently established to. (Read Only) |
| 0x0006 | Peer UDP Port: UDP Port of the peer a connection is currently established to. (Read Only) |
| 0x0007 | PACKET_TIMEOUT: The amount of time to wait before retransmitting a TNP datagram sent to this peer. This value supersedes the value in the TNP Capability Structure. Read-Write. |
| 0x0008 | Maximum Transmit Rate: The maximum rate at which data may be transmitted onto the network. This value supersedes the value in the TNP Capability Structure. Read-Write. |
| 0x0009 | Maximum Transmit Unit: The maximum size of a datagram that may be transmitted onto the network. This value supersedes the value in the TNP Capability Structure. Read-Write. |

FIG. 3E

THIN CLIENT DISCOVERY

BACKGROUND OF THE INVENTION

Thin clients can provide efficient use of compute resources across multiple users and multiple locations. Generally a thin client will connect to a broker and request a compute resource such as a virtual machine that can provide services to the client. Typically, this is done by the thin client opening a browser, initiating a connection with the broker and then interacting with the broker. However, the ability to do this represents a certain level of complexity and cost for the thin client. It would be useful to further simplify the thin client to reduce the cost of the thin client system. With such a simplified thin client, it would be useful to have a consistent method to connect the thin client and the compute resource.

BRIEF DESCRIPTION OF THE DRAWINGS

Various embodiments of the invention are disclosed in the following detailed description and the accompanying drawings.

FIG. 2B is a diagram illustrating an example TNP datagram.

FIG. 2C is a diagram illustrating an example payload for a TNP datagram.

FIG. 3B is a diagram illustrating an example End Point Zero message.

FIG. 3C is a table illustrating an example configuration address space and its resources.

FIG. 3D is a table illustrating an example capability structure format.

FIG. 3E is a table illustrating an example TNP Peer Capability Structure.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
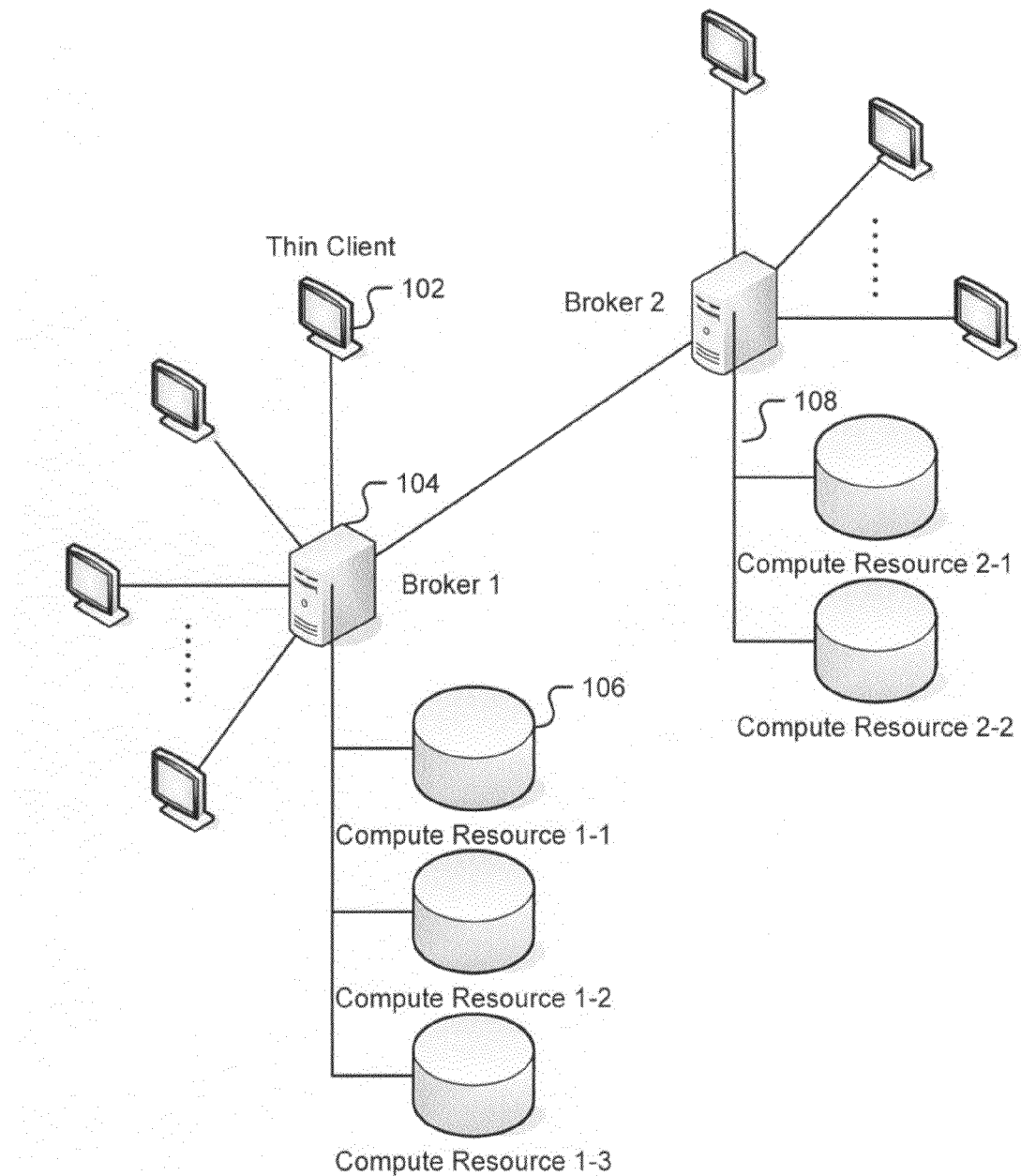
FIG. 1A is a network diagram illustrating an embodiment of a thin client system requiring discovery.

FIG. 1A is a network diagram illustrating an embodiment of a thin client system requiring discovery. Thin client 102 is connected over a network to a compute resource 106 and a broker 104 using a network protocol 108. In some embodiments the network protocol 108 used is a thin network protocol ("TNP") over the Internet Protocol ("IP.") Throughout this specification, "network" refers to any public or private network and/or combination thereof. A network may include the Internet, an Ethernet, a serial/parallel bus, intranet, local area network ("LAN"), wide area network ("WAN"), or any form of connecting multiple systems and/or groups of systems together. Broker 106 is connected using TNP 108 to one or more thin clients 102, compute resources 104 and may connect to other brokers 106.

Thin client 102 is a client device available to users of the system. In some embodiments, these can be "soft" clients running on a personal computer ("PC") instead of physical client device. Compute resource 104 is a virtual machine or other types of compute resources that users log into. Compute resource 104 may be a virtual machine, remote universal serial bus ("USB") device, or other computing device for access by thin client 102. A thin client 102 may be of low complexity and cost, and without a local operating system ("OS,") software, firmware, or central processing unit ("CPU") of any kind. Hence, each thin client 102 needs assistance to find any compute resource 104.

Broker 106 is the device that assists thin client 102 to find a compute resource 104. Thin client 102 may be so limited in complexity that it needs assistance to find any broker 106. The broker 106 is thus responsible for discovering thin client 102. In some embodiments, the broker 106 is responsible for further rendering a user interface to collect the information necessary to determine which compute resource 104 the thin client 102 ultimately gets connected to.

Figure 1B:
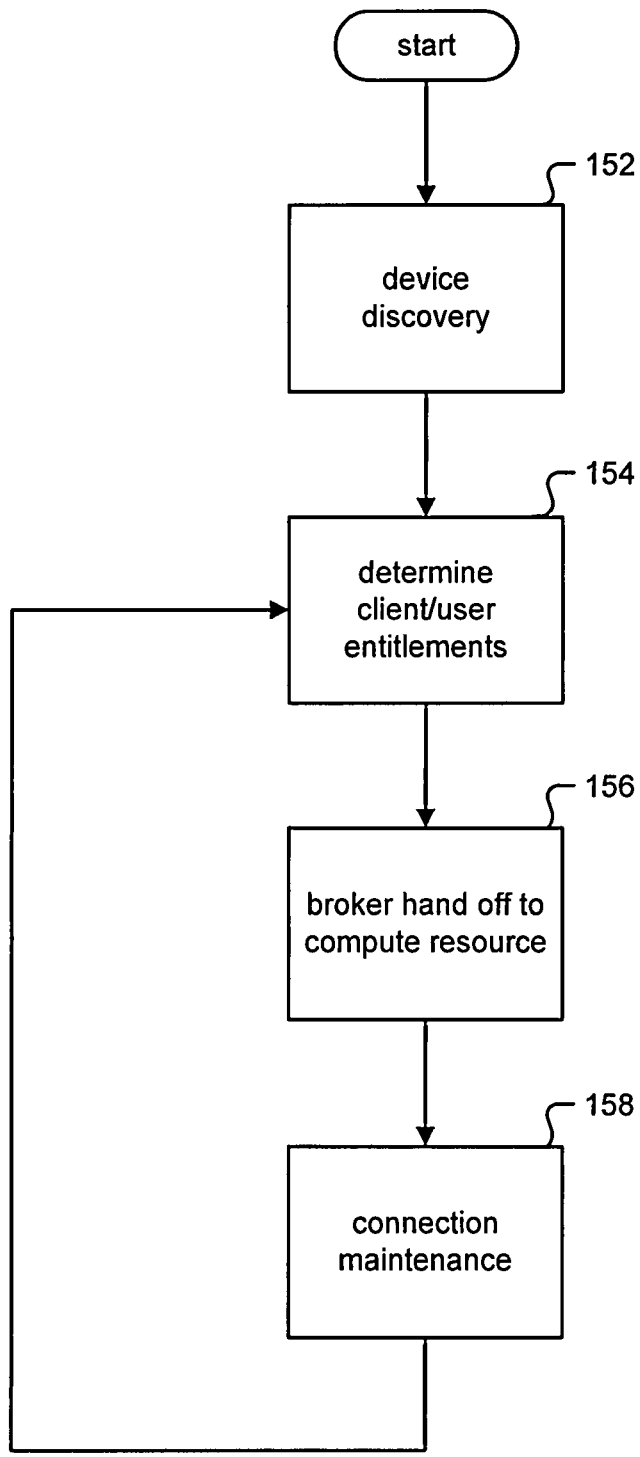
FIG. 1B is a flowchart illustrating an embodiment of a process for thin client discovery.

FIG. 1B is a flowchart illustrating an embodiment of a process for thin client discovery. This process may be implemented in the system of FIG. 1A.

In step 152, a device in the thin client system of FIG. 1A is discovered. To allow a thin client 102 of low complexity and cost, the thin client 102 may not have the capability to originate any network connections or discover the network autonomously. There are at least five methods for discovering thin clients in such a system:

1. Broadcast Discovery on local LAN segment: The broker 106 periodically sends out a broadcast packet on a local LAN segment probing for thin clients 102. All thin clients 102 respond to that probe announcing their presence. The broker 106 then keeps track of all thin clients 102 in a local database. Once a thin client 102 has been discovered, the broker 106 sends it a command (driver level message) telling it to no longer respond to discovery probes. By telling already discovered thin clients 102 to not respond, network bandwidth/load on the broker 106 can be reduced. The thin client 102 uses a watchdog mechanism such that responding to discovery probes is re-enabled if contact is lost with the broker 106 or a connected compute resource 104.

2. Broadcast Discovery on remote LAN segment. This is identical to the Broadcast Discovery on local LAN segment method, except that the broadcast request is expected to be routed by a router to a remote LAN segment. In many situations, routers are configured to not forward broadcasts to remote segments, in which case broadcast discovery may not be an appropriate discovery method.

3. Unicast Discovery: This is similar to the Broadcast Discovery methods, except that discovery probes are sent iteratively to a sequence or range of IP addresses. No response will be received from IP addresses that are either not valid, or are not thin clients 102. The process is optimized such that addresses are no longer probed once they are discovered, and addresses that were most recently discovered are probed with a higher priority and/or rate as it is more likely a thin client 102 will appear there, because of the nature of Dynamic Host Configuration Protocol ("DHCP") leases.

4. DHCP with Client Announce: When a thin client 102 powers up on a DHCP network, it will get assigned an IP address by a DHCP server. Some DHCP servers will allow the DHCP response to include additional vendor or option codes. In such a case, the DHCP server would supply an IP address for the broker 106. In these cases, the thin client 102 can then contact the broker 106 and announce itself.

5. Thin Client Remote Assist: For cases where the thin client 102 is on a remote LAN segment where the broker 106 cannot direct a broadcast, and the broker 106 has discovered a thin client 102 on that remote LAN segment using any of these Discovery methods, the broker 106 can then ask that thin client 102 to do a local broadcast probe searching for other thin clients 102. The responses from those thin clients 102 are forwarded to the broker 106.

To allow a thin client 102 of low complexity and cost, discovery probes are nothing more than TNP configuration read requests, except they are directed as a broadcast. Thin clients 102 receiving this request process it normally and response with a standard configuration read response. Likewise, the announcement used in the DHCP with Client Announce method are nothing more than a configuration read response to a configuration read request ("CRRQ") that was generated virtually and locally at the thin client 102 instead of being generated remotely over the network.

In step 154, the discovered thin client 102 is mapped to a possible compute resource 104 that the thin client 102 is entitled to, or that the thin client 102 and its user is entitled to. To allow a thin client 102 of low complexity and cost, the thin client 102 may require the broker 106 to perform all rendering of a user interface to determine a compute resource 104 a user is allocated.

In step 156, the broker 106 then hands off the thin client 102's connection to the mapped compute resource 104. To allow a thin client 102 of low complexity and cost, the thin client 102 may only permit one connection at a time, so that the broker 106 first tears down its connection to thin client 102, and persuades the compute resource 104 to connect to the thin client 102 once the broker 106 connection is torn down.

In step 158, the operational connection between thin client 102 and compute resource 104 is maintained by broker 106. The thin client 102 has a virtual or physical Help button that allows the thin client 102 to request help outside of the operational connection. By asserting the Help button, the user of thin client 102 can:

1. Rollback: Request a temporal rollback of the state of compute resource 104. In some embodiments, this includes taking periodic snapshots of the state of compute resource 104 every, for example, twenty-four hours, and allows the user to reload a previous state to compute resource 104.

2. Trouble Ticket: File a trouble ticket with the thin client system administrator for assistance. In some embodiments, this trouble ticket will be sent over email, web, phone, pager, or cell phone messaging service.

3. Broker Assistance: Sending an escalating request to the currently connected compute resource 104, the compute resource agent, and the broker 106, to regain control over an operational connection, or rediscover the thin client 102. In some embodiments, the thin client 102 will be augmented to allow direct notification of the broker when the Help button is asserted.

4. Quarantine: Quarantine the existing compute resource, marking it as in need of repair, and provide the user with a new compute resource.

5. Other Functions as customized by the system administrator using application programming interfaces (APIs) and/or scripts.

After the connection is broken down, the device remains discovered and returns to step 154 for the next client or user entitlements.

Figure 2A:
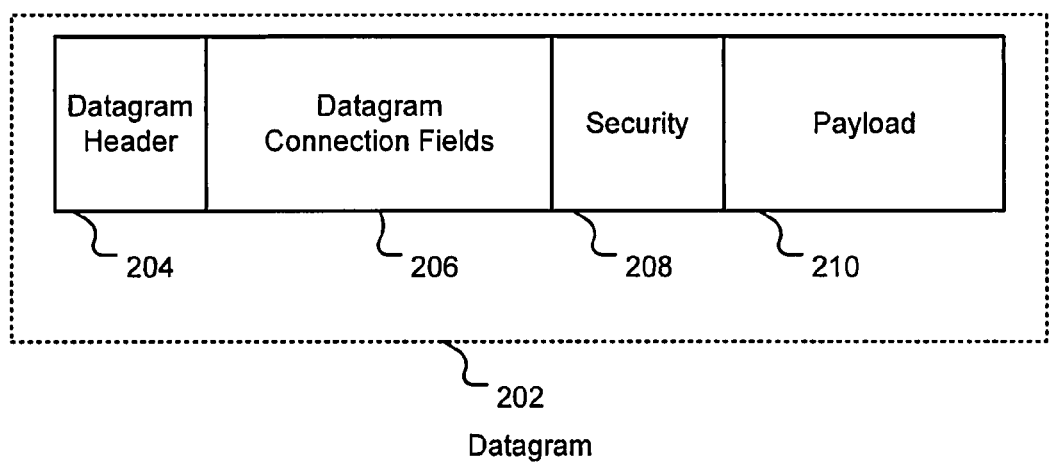
FIG. 2A is a diagram illustrating a general packet format for a TNP.

FIG. 2A is a diagram illustrating a general packet format for a TNP. These packets are units of data also referred to as TNP datagrams 202. The TNP datagram 202 includes a datagram header 204, datagram connection fields 206, security field 208, and payload 210. Datagram header 204 includes version and identification information. Datagram connection fields 206 allow for host to client connections. Security field 210 is reserved for authentication and encryption of the TNP datagram 202. The payload 210 is the data carried by TNP datagram 202.

TNP 108 allows two or more devices to communicate with one another over a network while minimizing the size, complexity and cost of the required implementation. In some embodiments, TNP 108 is implemented in hardware using digital logic. In some embodiments, TNP 108 is implemented in software. Any communication between devices can be considered to be the combination of a plurality of host to client interactions. In a given interaction, the host is the initiator of the communication, and the client is the target. On a network, each device may simultaneously assume the role of host and client, and multiple hosts and clients may coexist on the network. Furthermore, each device may simultaneously assume the role of multiple hosts and/or multiple clients.

TNP 108 allows for communication across any computer or telecommunications network. TNP 108 transfers datagrams across the underlying network. In some embodiments, TNP datagrams 202 are transferred over UDP/IP, making it possible to use TNP 108 over any IP capable network such as Ethernet, wireless Ethernet, or general packet radio service ("GPRS.")

TNP 108 allows for two forms of host to client interactions. The first form is referred to as connection-less transport, and the second is referred to as connection oriented transport.

All interactions serve to transfer units of data referred to as messages between the host and client, or the client and host. These messages are carried over the network using TNP datagrams 202. A message may be as short as 1 byte, or as long as is supported by the particular embodiment. In some embodiments, the size of the message is limited based on various factors including the amount of available buffering and the maximum transmit unit ("MTU") on the underlying network. A message fits within a single TNP datagram 202 to be transferred on the underlying network. A message may be considered a small portion of a larger data transfer. Messages may be used to transfer commands in addition to data. Commands are specially encoded data bytes requesting the host or client to perform a certain action.

FIG. 2B is a diagram illustrating an example TNP datagram. In some embodiments, TNP datagram 202 contains the following fields:

Oob: 1-bit Boolean to indicate if the TNP datagram 202 is part of connection-less transport or connection-oriented transport. If the Oob bit is set, the TNP datagram 202 should be processed under the rules set forth for connection-less transport. If the Oob bit is cleared, the TNP datagram 202 should be processed under the rules set forth for connection-oriented transport;

Syn: 1-bit Boolean to indicate when sequence numbers need to be synchronized as part of a connection-oriented transport's connection setup sequence, or when order ID need to be synchronized as part of a connection-less transport interaction;

Ack: 1-bit Boolean indicating if the TNP datagram 202 is acknowledging a TNP datagram 202 received;

Nack: 1-bit Boolean indicating if the TNP datagram 202 is indicating that a lost TNP datagram 202 was detected;

Rst: 1-bit Boolean used for connection-oriented transport indicating when a connection is being torn down;

Ordered: 1-bit Boolean used to indicate when the OrderId field is valid;

SeqNo: Sequence number of TNP datagram 202;

AckSeqNo: Sequence number of TNP datagram 202 being acknowledged when the Ack bit is set, or the sequence number of the next expected datagram when the Nack bit is set;

OrderId: OrderId used to determine the order of TNP datagrams 202 for connection-less transport. Sequence numbers, such as SeqNo, and OrderId are compared using a circular comparison function;

Messages: A TNP datagram 202 with a payload may contain one or more messages. Each message may be 1 or more bytes in length. The special case of zero-byte messages may also be optionally supported; and Payload: A TNP datagram 202 may contain a payload 210.

FIG. 2C is a diagram illustrating an example payload for a TNP datagram. A payload 210 is 1 or more bytes comprising data, commands, or messages. In some embodiments, a payload 210 is used to carry one or more messages.

Connection oriented transport allows a series of messages to be reliably transferred in order between a host and a client. Before messages may be transferred, the host initiates a connection setup sequence in order to establish a connection. Once the connection has been established, messages may flow in either direction until either the host or client tears down the connection.

A host or client may have several established connections simultaneously. In some embodiments, to reduce complexity and cost a client may be restricted to a small number of connections, or one connection. When a TNP datagram 202 is received by a host or client, it determines if the TNP datagram 202 is associated with connection oriented or connection-less transport. Further, it determines if the TNP datagram 202 is associated with a currently established connection. The former is determine by examining the Oob bit in the TNP datagram 202, and the latter is determine by examining various fields in the packet containing the TNP datagram 202 and comparing those fields against a table of peers to which a connection is currently established in order to identify the peer and its associated connection.

The exact structure of the peers table is dependent on the type of network carrying the TNP datagrams 202. In some embodiments, TNP datagrams 202 are transported using UDP/IP. In such an embodiment, the peer would be identified by its IP address and UDP port number.

For each established connection, the host and client maintains a set of resources such as a state variable associated with a state machine, various sequence numbers, and various timers. The description below of connection oriented transport makes references to these resources under the assumption that a unique resource is allocated for each connection.

A host may initiate a connection setup sequence to a client by sending a TNP datagram 202 containing a connection request to the client. The client may either accept or refuse the connection by responding with a TNP datagram 202 containing either a positive or negative acknowledgement. The connection is completed by the host sending the client a TNP datagram 202 acknowledging that the connection setup is complete. This process is described in more detail below.

The host and client each maintain a state machine to assist with the process. The host state machine has the following states: IDLE, SYN, ACK, and CONNECTED. The client state machine has the following states: IDLE, SYN-ACK, and CONNECTED. Initially, both the host and client are in the IDLE state. The following procedure is used:

Step 1. SYN: First, the host creates an entry in the peer table to help identify future TNP datagrams 202 received as part of this connection. The host sends the client a TNP datagram 202 with the Syn bit set, and the SeqNo field set to the sequence number of the first TNP datagram 202 of the connection for TNP datagrams 202 traveling from the host to the client. This sequence number may be selected arbitrarily by the host. Once the TNP datagram 202 is sent, the host enters the SYN state;

Step 2. SYN-ACK: Once the client receives TNP datagram 202 sent in step 1, adds an entry to its peer table, enters the SYN-ACK state, and responds to the host with a TNP datagram 202 with both the Syn and Ack bits set, the SeqNo field indicating the sequence number of the first TNP datagram 202 of the connection for TNP datagrams 202 traveling from the client to the host, and the AckSeqNo field set to the sequence number of the TNP datagram 202 received in Step 1. The SeqNo selected by the client is also arbitrary; and Step 3. ACK: Once the host receives the TNP datagram 202 sent in step 2, it enters the ACK state and responds to the client with a TNP datagram 202 with the Ack bit set, the SeqNo field having been incremented, and the AckSeqNo indicating the sequence number of the TNP datagram 202 received in Step 2. Upon reception of this TNP datagram 202, the client enters the CONNECTED state. After transmitting this ACK TNP datagram 202, the host may begin transmitting TNP datagrams 202 containing messages. Optionally, the host may include a message in the TNP datagram 202 sent in this step.

The TNP protocol is designed to be carried over unreliable networks. Hence, datagrams may have been lost during any of these steps. The following rules are followed to ensure successful connection setup:

Rule 1: If the host transmits a SYN TNP datagram 202 and does not receive a response within a reasonable amount of time (SYN_TIMEOUT), it may re-transmit the SYN request with the same sequence number. This may be repeated a reasonable number of times (SYN_MAX_RETRY) at which point the host should give up and enter the IDLE state;

Rule 2: If the client receives a SYN request from the same peer while in the SYN-ACK state, it re-transmits the SYN-ACK TNP datagram 202 previously transmitted with the same sequence numbers previously used;

Rule 3: If after transmitting a SYN-ACK, the client does not receive an ACK within a reasonable amount of time (SYNACK_TIMEOUT), it re-transmits the SYN-ACK TNP datagram 202 previously transmitted with the same sequence numbers previously used. This may be repeated a reasonable number of times (SYNACK_MAX_RETRY) at which point the client should give up and enter the IDLE state;

Rule 4: If the host receives a SYN-ACK TNP datagram 202 while in the ACK state, it re-transmits the ACK TNP datagram 202 previously sent with the same sequence numbers. Any packets sent after the ACK packet is also be re-transmitted;

Rule 5: If the host is in the ACK state and receives a TNP datagram 202 acknowledging a TNP datagram 202 with a payload sent after the ACK packet in Step 3, then the host will enter the CONNECTED state;

Rule 6: If the client receives a SYN from its peer while in the CONNECT state, it responds with a TNP datagram 202 with the Ack bit set and AckSeqNo set to the sequence number of the most recently received valid TNP datagram 202; and Rule 7: If while in the SYN state the host receives a packet with the Ack bit set and the Syn bit is not set, it responds with a packet with only the Rst bit set.

If the client receives a connection request but does not have the resources to accept the connection or does not wish to accept the connection for any other reason, it refuses the connection by responding with a packet with both the Syn and Nack bits set, and the AckSeqNo field set to the sequence number of the SYN packet requesting the connection.

Optionally, the client need not implement the SYNACK_TIMEOUT and SYNACK_MAX_RETRY mechanisms. Instead, the burden of detecting a lost Step-3 ACK may be placed on the host. This is accomplished by always including a message in the ACK TNP datagram 202 sent in Step-3. When the client receives the TNP datagram 202 containing the ACK and message, it will respond with an acknowledgement. The host may use the acknowledgement to determine when the Step-3 ACK has been received by the client and the connection setup sequence is complete. If after sending the Step-3 ACK to the client, the host does not receive an acknowledgement within a reasonable amount of time, it should retransmit the Step-3 ACK. This may be repeated a reasonable number of times if necessary, at which point the host may give up and return to the IDLE state.

Once the connection between the host and client has been setup, TNP datagrams 202 continue to flow between the host and client to maintain connection state, transfer messages, and ensure reliable reception of messages. Once connected, a TNP datagram 202 may contain an acknowledgement, or payload, or both. The SeqNo field contains a valid sequence number. The SeqNo field of TNP datagrams 202 without a payload contains the sequence number of the next TNP datagram 202 with a payload that will be transmitted. For TNP datagrams 202 with the Ack bit set, the AckSeqNo field contains the sequence number of the last TNP datagram 202 with a payload received For TNP datagrams 202 with the Nack bit set, the AckSeqNo field contains the next expected sequence number of a TNP datagram 202 with a payload.

Once in the ACK or CONNECTED state, the host abides by the following rules:

Rule 1: The host maintains a TXSEQNO sequence number to keep track the sequence number of transmitted TNP datagrams 202;

Rule 2: The TXSEQNO may be initialized to any value. The initial value is transmitted in the SYN packet initiating the connection. The TXSEQNO is incremented when the host receives the SYN-ACK TNP datagram 202 that pushes it into the ACK state;

Rule 3: Each TNP datagram 202 transmitted by the host contains the value of TXSEQNO in the SeqNo field;

Rule 4: If a TNP datagram 202 is transmitted with a payload, then TXSEQNO is incremented after the packet is transmitted;

Rule 5: The host maintains a copy of all TNP datagrams 202 transmitted until they are acknowledged;

Rule 6: If the host receives a TNP datagram 202 with the Ack bit set, then all previously transmitted packets with a sequence number (SeqNo) less then or equal to the AckSeqNo field of the received TNP datagram 202 are considered to be acknowledged;

Rule 7: If the host does not receive an acknowledgement for a previously transmitted TNP datagram 202 within a reasonable amount of time (PACKET_TIMEOUT), it retransmits that TNP datagram 202 and all subsequent TNP datagrams 202 with their respective sequence numbers. When re-transmitting a TNP datagram 202, the Ack, Nack, and AckSeqNo fields are updated to reflect the current state;

Rule 8: The host maintains an RXSEQNO sequence number to keep track of the sequence number of received TNP packets;

Rule 9: The RXSEQNO is initialized to the value of the SeqNo field+1 in the SYN-ACK TNP datagram 202 that pushed the host into the ACK state;

Rule 10: If a TNP datagram 202 with a payload is received with SeqNo equal to RXSEQNO, then the payload may be accepted and RXSEQNO incremented. If the host does not have enough buffering to accept the payload, it may discard the payload but still processes the other fields in the header. The host should transmit a TNP datagram 202 to the client with the Ack bit set and AckSeqNo set to the SeqNo of the received packet. The host may choose to delay transmission of the Ack until payload is available to be sent with it, or until multiple Acks can be combined together. However, the host should not delay transmission of the Ack so long that the client retransmits the original packet. If the payload of the datagram was discarded, then RXSEQNO should not be incremented, and a TNP datagram 202 containing an Ack should not be sent. The client may optionally transmit a TNP datagram 202 containing a Nack to the host indicating that the payload was lost and it needs to be retransmitted;

Rule 11: If a TNP datagram 202 with or without a payload is received with SeqNo greater than RXSEQNO, then the host transmits a TNP datagram 202 to the host with the Nack bit set and AckSeqNo set to RXSEQNO. The payload of any such packet is discarded; and Rule 12: The host should retransmit the most recently transmitted Ack with each TNP payload packet transmitted.

Once in the CONNECTED state, the client abides by the following rules:

Rule 1: The client maintains a TXSEQNO sequence number to keep track the sequence number of transmitted TNP datagrams 202;

Rule 2: The TXSEQNO may be initialized to any value. The initial value is transmitted in the SYN-ACK TNP datagram 202 initiating the connection. The TXSEQNO is incremented when the client receives the ACK TNP datagram 202 that pushes it into the CONNECTED state;

Rule 3: Each TNP datagram 202 transmitted by the client contains the value of TXSEQNO in the SeqNo field;

Rule 4: If a TNP datagram 202 is transmitted with a payload, then TXSEQNO is incremented after the packet is transmitted;

Rule 6: The client maintains a copy of all TNP datagrams 202 transmitted until they are acknowledged;

Rule 7: If the client receives a TNP datagram 202 with the Ack bit set, then all previously transmitted TNP datagrams 202 with a sequence number (SeqNo) less then or equal to the AckSeqNo field of the received packet are considered to be acknowledged;

Rule 8: If the client does not receive an acknowledgement for a previously transmitted TNP datagram 202 within a reasonable amount of time (PACKET_TIMEOUT), it retransmits that TNP datagram 202 and all subsequent packets with their respective sequence numbers. When retransmitting TNP datagrams 202, the Ack, Nack, and AckSeqNo fields are updated to reflect the current state;

Rule 9: The client maintains an RXSEQNO sequence number to keep track of the sequence number of received TNP packets;

Rule 10: The RXSEQNO is initialized to the value of the SeqNo field+1 in the SYN packet that pushed the client into the SYNACK state;

Rule 11: If a packet with a payload is received with SeqNo equal to RXSEQNO, then the payload may be accepted and RXSEQNO incremented. If the client does not have enough buffering to accept the payload, it may discard the payload but still processes the other fields in the header. The client should transmit a TNP packet to the host with the Ack bit set and AckSeqNo set to the SeqNo of the received packet. The client may choose to delay transmission of the Ack until payload is available to be sent with it, or until multiple Acks can be combined together. However, the client should not delay transmission of the Ack so long that the host retransmits the original packet;

Rule 12: If a packet with or without a payload is received with SeqNo greater than RXSEQNO, then the client transmits a packet with the Nack bit set and AckSeqNo set to RXSEQNO. The payload of any such packet is discarded; and Rule 13: The client should retransmit the most recently transmitted Ack with each TNP datagram 202 transmitted containing a payload.

Both the host and client each maintain a PACKET_TIMEOUT timer that determines how long the host or client should wait before assuming that a TNP datagram 202 was lost and retransmitting it. For example, if the PACKET_TIMEOUT timer is set to 5 ms on the client, then the client would wait for 5 ms after transmitting a TNP datagram 202 to the host, and if at that time the TNP datagram 202 has not been acknowledged, then it would retransmit the TNP datagram 202.

The host and client may use different values for the PACKET_TIMEOUT. The value of the PACKET_TIMEOUT timer is determined based on the round trip TNP datagram 202 to acknowledgement delay. It is up to the host or client to measure this round-trip delay and determine the appropriate value of PACKET_TIMEOUT. The client may optionally not implement the functionality to measure round-trip delay and program PACKET_TIMEOUT appropriately. In such a case, the host would be responsible for measuring round trip delay and instructing the client as to the appropriate value to be used for PACKET_TIMEOUT.

An existing connection can be disconnected by sending a TNP datagram 202 with the Rst bit set. A host wishing to teardown a connection should use the following procedure:

Step 1. Wait until all out-standing TNP datagrams 202 have been acknowledged, including retransmitting TNP datagrams 202 as necessary. If this does not occur within a reasonable amount of time, proceed to step 2;

Step 2. RST: Send the client a TNP datagram 202 with the Rst bit set; and

Step 3. RSTACK: Wait until the client responds with a TNP datagram 202 with the Rst and Ack bits. If this TNP datagram 202 is not received within a reasonable amount of time, return to step 2. If this procedure is repeated a reasonable number of times without success, the host may consider the connection tear-down complete.

Likewise, a client wishing to teardown a connection should use the following procedure:

Step 1. Wait until all out-standing TNP datagrams 202 have been acknowledged, including retransmitting TNP datagrams 202 as necessary. If this does not occur within a reasonable amount of time, proceed to step 2;

Step 2. RST: Send the host a TNP datagram 202 with the Rst bit set; and

Step 3. RSTACK: Wait until the host responds with a TNP datagram 202 with the Rst and Ack bits. If this TNP datagram 202 is not received within a reasonable amount of time, return to step 2. If this procedure is repeated a reasonable number of times without success, the client may consider the connection tear-down complete.

The host abides by the following rules:

Rule 1: If the host receives an RST TNP datagram 202, it ceases transmission of packets to the client;

Rule 2: If after sending a RST TNP datagram 202 the host does not receive a response containing an RSTACK within a reasonable amount of time (PACKET_TIMEOUT), it retransmits the RST. This may be repeated a reasonable number of times (RST_MAX_RETRY);

Rule 3: If the host receives an RST TNP datagram 202 from its peer while in the CONNECTED state, it responds with an RSTACK; and Rule 4: If the host receives any TNP datagram 202 from a non-peer, it responds with an RST.

The client abides by the following rules:

Rule 1: If the client receives an RST TNP datagram 202, it ceases transmission of packets to the client;

Rule 2: If the client receives an RST TNP datagram 202 from its peer while in the CONNECTED state, it responds with an RSTACK;

Rule 3: If the client receives any TNP datagram 202 from a non-peer, it responds with an RST;

Rule 4: If after sending a RST TNP datagram 202 the client does not receive a response containing an RSTACK within a reasonable amount of time (PACKET_TIMEOUT), it retransmits the RST. This may be repeated a reasonable number of times (RST_MAX_RETRY); and Rule 5: If the client receives an RSTACK TNP datagram 202, it is ignored.

The client may optionally implement a timeout, known as a activity timeout, that results in the connection being torn down if no TNP datagrams 202 are received for a reasonable amount of time. In such a case, the host may implement a keep-alive mechanism that periodically ensures that a TNP datagram 202 is transmitted to the client to keep the connection established and prevent the client for initiating a connection tear down. This keep alive packet need not contain anything other than the required fields, but may optionally contain an Ack.

If an atypically high rate of TNP datagrams 202 loss is experienced, it may be an indication of congestion on the network. The host and/or client may implement mechanisms to detect TNP datagram 202 loss and respond by reducing the amount of data being sent onto the network.

To reduce complexity and cost of the client, the client may optionally not implement its own congestion control mechanisms. Instead, the host can detect when TNP datagrams 202 transmitted from the client to the host are being lost and respond by sending a command to the client instructing it to reduce its bandwidth utilization.

For connection oriented transport, a copy of each TNP datagram 202 sent is stored in a buffer until it is acknowledged. This buffer is referred to as the replay buffer. If the size of the replay buffer is smaller than the round-trip TNP datagram 202 to acknowledgement delay, then transfer rate may be limited. In general, the maximum data rate of a connection can be characterized by the following equation, $$MaxRate = ReplayBufferSize / RoundTripDelay$$

For example, a replay buffer of 15 KB with a round-trip delay of 20 ms would limit the data rate to 6.1 Mbps. The replay buffer should be sized by the client and host keeping in mind typical data rates and round trip delays.

$$ReplayBufferSize > MaxRate \times RoundTripDelay$$

Hence, if 10 Mbps of bandwidth is required on a network with a 50 ms round-trip delay, the minimum recommended replay buffer size is 64 KB.

The client or host may optionally choose to use a smaller replay buffer to save on resources, with the understanding that the maximum transfer rate will be limited. This may be acceptable for certain applications.

There is no need for the replay buffer sizes in the client and host to be matched. In a scenario where high data rates and required in one direction and not the other, it may make sense to size the buffers such that one is large and the other is small.

Because TNP datagrams 202 are buffered before they are transmitted, resources may be saved by reducing the maximum allowable size of a TNP datagram 202 that the client or host will transmit. There is no need for the maximum allowable size of be the same on the client and host. One may choose to transmit large packets, while the other chooses to transmit only small packets.

Depending on the particular embodiment, complexity and/or resource requirements may be shifted from the client to the host using one or more of the following methods:

Method 1: Congestion control mechanisms may be implemented only on the host side. The host would detect TNP datagram 202 loss and instruct the client as to its maximum bandwidth utilization;

Method 2: The SYNACK_TIMEOUT and SYNACK_MAX_RETRY timers may be removed from the client side. The host would implement additional recover mechanisms to detect these error conditions. The three-way handshake would be replaced with a four-way handshake as described above;

Method 3: The client may limit the number of connections it is capable of simultaneously accepting to a small number, such as one;

Method 4: The client may limit the size of the retry buffer to reduce the amount of required resources;

Method 5: The client may limit the maximum size of a TNP datagram 202 that it will transmit to reduce required resources;

Method 6: The client may choose to not implement the activity timeout;

Method 7: The client may choose to not support connection-oriented transport, and to only support connection-less transport;

Method 8: The client may choose not to initiate connection tear-down; and

Method 9: Many of the timeouts and retry counters described above are programmable in value. The client may choose to allow the host to control these values instead of trying to control them itself. For example, the PACKET_TIMEOUT timer that determines the amount of time before the client will retransmit a TNP datagram 202 may be programmable by the host. The host will program the client with the appropriate PACKET_TIMEOUT value based on the round-trip delay as measured by the host.

Further methods may exist to shift complexity from the client to the host. There are additional mechanisms that reduce the required complexity and/or resources on the client. For example, the client does not need to implement the mechanisms necessary to initiate a new connection because connections are always initiated by the host. Furthermore, the client need not implement a keep-alive mechanism as this is the responsibility of the host.

A connection-less transport interaction may consist of one, two, or three stages depending on the requirements of the interaction. These three stages are:

Stage 1. A TNP datagram 202 consisting one or more messages is sent from the host to the client;

Stage 2. Optionally, the client may respond with a TNP datagram 202 containing no messages and an acknowledgement of the reception of the TNP datagram 202 received in stage 1; and Stage 3. Optionally, the client may respond with one or more datagrams containing one or more messages in response to the message(s) received in stage 1.

Legal interactions include stage 1 only, stages 1 and 2 only, stages 1 and 3 only, all three stages, or stage 1 with stages 2 and 3 being combined into the same TNP datagram or datagrams 202.

During this interaction, it is possible that one or more TNP datagrams 202 will be lost. In such a case, recovery mechanisms may be used to retransmit the lost messages.

Message transfer between the host and client is asymmetric in that a heavier burden is placed on the host to correct for TNP datagram 202 loss if desired. TNP datagrams 202 transmitted from the host to the client are acknowledged. If after transmitting a TNP datagram 202, the host does not receive an acknowledgement, then either the original TNP datagram 202 was lost, or its acknowledgement was lost. Because it is not possible to determine which of the two was lost, recovery is left to higher levels in the network stack. The TNP host will notify higher levels which packets were acknowledged, and which were not.

In a connection-less transport interaction, the host and client should abide by the following rules:

Rule 1: If the host or client receives a TNP datagram 202 with the Oob bit set and no payload, it is discarded;

Rule 2: If the client receives a TNP datagram 202 with the Oob bit set, the NoAck bit cleared, and a payload, it responds with an Acknowledgement TNP datagram 202. The acknowledgement TNP datagram 202 has the Oob and Ack bits sets, SeqNo is undefined, AckSeqNo set to the value of the SeqNo of the TNP datagram 202 being acknowledged, and no payload. Exactly one Acknowledgement TNP datagram 202 is sent for each packet received;

Rule 3: The value of the SeqNo field of all Oob packets transmitted from the client is always undefined;

Rule 4: After processing the messages, the client may choose to send TNP datagrams 202 including response messages to the host; and Rule 5: In order to distinguish acknowledgements from one another, the host should not recycle sequence numbers until all numbers in the sequence number space have been exhausted.

TNP datagrams 202 sent from the client to the host are not acknowledged. The client has no way of knowing if a transmitted TNP datagram 202 was lost. If the host was expecting a TNP datagram 202 that was not received, recovery may be attempted by higher levels in the network stack.

It is possible for the host to have several host-client interactions as described above in flight simultaneously. In other words, the host does not need to wait until a TNP datagram 202 has been acknowledged before sending additional TNP datagrams 202 associated with subsequent interactions.

Because TNP datagrams 202 my be delivered out of order, it is useful to provide a mechanism such that the client can distinguish when TNP datagrams 202 from the host have been received out of order in the case of multiple outstanding host-client interactions.

For any series of interaction between a host and client, the client should maintain an ORDERID state variable. If a TNP datagram 202 arrives with both the Ordered and Syn bits set, the ORDERID state variable should be set to value of the OrderId field in the TNP datagram 202. If a TNP datagram 202 arrives with Ordered bit set, the Syn bit cleared, and the OrderId field in the TNP datagram 202 less than the ORDERID state variable, then the TNP datagram 202 should be discarded, and a NACK TNP datagram 202 sent to the host with the AckSeqNo field set to the SeqNo of the TNP datagram 202 being discarded. Otherwise, if a TNP datagram 202 arrives with the Ordered bit set, then the ORDERID state variable should be set to the value of OrderId in the TNP datagram 202. TNP datagrams 202 with the Ordered bit cleared should be treated normally according to the rules described above.

A host communicating with a client through a series of interactions should increment the OrderId field in the TNP datagram 202 only when order is important. It may be possible that several TNP datagrams 202 sent in sequence are not sequence dependent. In such a case, they may be sent all with the same OrderId.

The first time a host sends a TNP datagram 202 to a client with the Ordered bit set, it should also set the Syn bit to indicate to the client that it should initialize its ORDERID state variable. The host should continue to set the Syn bit until a TNP datagram 202 with the Syn bit is acknowledged.

A host that wishes to maintain order for TNP datagrams 202 need not set the Ordered bit for all TNP datagrams 202. The host may choose to set the bit only for TNP datagrams 202 for which sequence is important.

To reduce implementation complexity or required resources, the client may choose to not support ORDERID. In such a case, the Ordered bit in the TNP datagram 202 should be ignored.

To reduce implementation complexity or required resources, the client may choose to limit the number of hosts for which it maintains an ORDERID state variable. Furthermore, this may be limited only to hosts for which a connection-oriented transport connection has been established.

Figure 3A:
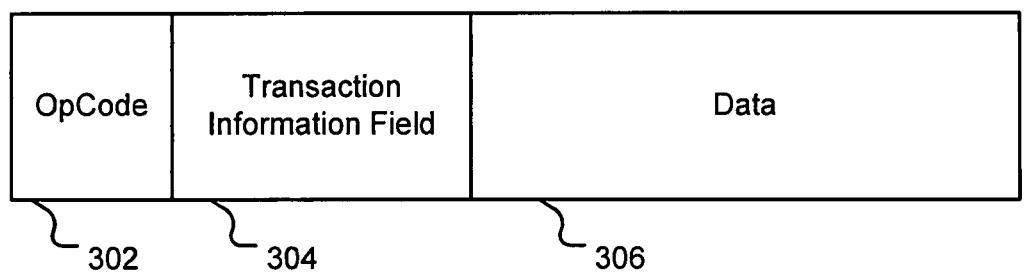
FIG. 3A is a diagram illustrating a general driver level message.

FIG. 3A is a diagram illustrating a general driver level message. This message includes an operation code ("OpCode") 302, of a driver level operation including control and status register ("CSR") reads, CSR writes, block data transfers, and interrupts. The message also includes a transaction information field 304 which contains metadata about the message, for example length. The data, if any, is stored in field 306. In some embodiments, to reduce latency, an interrupt OpCode 302 will combine interrupt data in data 310 with the interrupt message.

TNP 108 allows messages to be transferred in either direction between the host and client. Because there may be one or more producers or consumers of messages, it may be useful to allow each message to be associated with a particular producer or consumer. In some embodiments, a field in each message is included called EndPoint. The EndPoint field indicates which message consumer the message is destined to. Each message consumer is referred to as an end point.

A network may have many hosts and clients on it, and further there may be one or more types of hosts or clients on the network. For example, a network may simultaneously have a terminal server and a voice over internet protocol gateway each acting as hosts, and a thin client and voice over internet protocol handset each acting as a client. Hence, it is useful to provide standard mechanisms that clients may implement to aid with detection of a client, determination of the type of client, and configuration of the client.

In some embodiments, an End Point with ID 0 is implemented that is common across all types of devices. Any message received in a TNP datagram 202 with an EndPoint field of 0 is processed by End Point Zero.

Messages sent to End Point Zero of a client contain commands, also referred to as operations. The client may respond to a command by sending a message to End Point Zero of the host that the command arrived from. When End Point Zero of a client processes a message it stores the source of the TNP datagram that the message arrived in so that it can send a response back to the same host if necessary.

Furthermore, a client may choose to send messages to End Point Zero of a host to notify the host of certain events, such as interrupts or error conditions. These messages are initiated by the client and are not necessarily in response to a command sent by the host.

FIG. 3B is a diagram illustrating an example End Point Zero message. In some embodiments, messages sent to End Point Zero of a host or client contain the following fields:

OpCode: This field indicates the type of operation carried by the message. Valid OpCodes include No Operation, Configuration Read, Configuration Read Return, Configuration Write, CSR Write, CSR Read, CSR Read Return, Interrupt, and Error;

Len: Indicates the length of the operation in 32-bit words;

Addr: Indicates the starting word address of the operation; and

Data: The data associated with the operation if any.

End Point Zero on the client allows the host to detect and configure clients on the network. Access to the client is performed through Read and Write operations to resources on the client. The host indicates which resource is being operated on through an address field, which is used to address the resources. End Point Zero has two address spaces, referred to as Configuration address space, and CSR address space.

In some embodiments, End Point Zero on the client abides by the following rules:

Rule 1: Messages destined to End Point Zero on the host or client would have the format shown in FIG. 3B;

Rule 2: Whenever End Point Zero on the client receives a message requesting that an operation be performed and the operation requires that a response be sent back to the host, then the response message is sent to End Point Zero of the peer that the operation request arrived from using the same type of transport (connection-less or connection-oriented) that the request arrived on;

Rule 3: If the operation is a Configuration Read Request, then the resources located at the address in the Address field of the request through address (Address+Length−1) inclusive of the configuration address space should be read, and the data returned in an End Point Zero Message with OpCode Configuration Read Return, the read data in the Data field, and all other field being preserved from the original request;

Rule 4: If the operation is a CSR Read Request, then the resources located at the address in the Address field of the request through address (Address+Length−1) inclusive of the CSR address space should be read, and the data returned in an End Point Zero Message with OpCode CSR Read Return, the read data in the Data field, and all other field being preserved from the original request;

Rule 5: If the operation is a Configuration Write Request, then the resources located at the address in the Address field of the request through address (Address+Length−1) inclusive of the configuration address space should be written with the data in the Data field of the request;

Rule 6: If the operation is a CSR Write Request, then the resources located at the address in the Address field of the request through address (Address+Length−1) inclusive of the CSR address space should be written with the data in the Data field of the request;

Rule 7: An interrupt controller connected to End Point Zero may request than an interrupt be sent to the host. In such a case, a End Point Zero Message with OpCode Interrupt should be sent to the host. The Address, Data, and Transaction ID fields can be used to carry further information identifying the source, type, and characteristics of the interrupt. The interrupt controller would have to inform End Point Zero of which hosts to transmit an interrupt to, although by default the interrupt would be sent to all hosts with an established connection to the client; and Rule 8: If an error occurs while completing a read or write request, either because of an invalid address, a timeout, or some other error condition, the client may wish to send an error response to the host. In such a case, an End Point Zero Message with OpCode Error and all other fields being preserved should be sent back in place of the response.

In some embodiments, the resources in configuration address space are intended to be the same across all types of devices. These resources are used to determine the type of device, and to configure common aspects of these devices. Those resources unique to a device are intended to be in the CSR address space. Likewise, the properties of End Point Zero are intended to be common across all devices, and all other end points are intended to be used for purposes unique to each type of device.

FIG. 3C is a table illustrating an example configuration address space and its resources. The contents and capabilities of the configuration address space may be extended by the use of capability structures. A capability structure is contiguous block of addresses in configuration address space, with the first few addresses containing a standard set of resources describing the capability structure, and the remainder of the address block containing resources specific to that type of capability structure. The purpose of capability structures is to define resources found in configuration address space that have a common structure, but may be implemented optionally be devices.

FIG. 3D is a table illustrating an example capability structure format. Capability structures are arranged as a linked list in configuration address space. The first one in the chain is pointed to by the pointer at address 0x0004. Each capability structure will in turn point to the next one in the list. The last capability structure in the list will have a pointer with value 0x0. Capability structures are addressed with an offset relative to the address pointed to by the pointer.

A capability structure called the TNP Capability Structure is:

| Offset (Hex) | Description |
|---|---|
| 0x0000 | Capability Structure ID (0x001). Read Only. |
| 0x0001 | Next Capability Structure Pointer. Read Only. |
| 0x0002 | PACKET_TIMEOUT: Amount of time to wait before retransmitting a TNP datagram, as defined above. Read-Write. |
| 0x0003 | Maximum Transmit Rate: The maximum rate at which data may be transmitted onto the network. Read-Write. |
| 0x0004 | Maximum Transmit Unit: The maximum size of a datagram that may be transmitted onto the network. Read-Write. |
| 0x0005 | Maximum Receive Unit: The maximum size of a datagram that may arrive from the network. Read-Only. |
| 0x0006 | Maximum Connections: The maximum number of established connection supported by the device. Read-Only. |
| 0x0007 | Feature Vector: Vector of read-only bits, where each bit indicates if a particular feature is supported. Bit 0 indicates if SYNACK_TIMEOUT is supported. Read Only. |
| 0x0008 | DHCP Enable: Indicates Dynamic Host Configuration Protocol ("DHCP") should be used to obtain an IP address. Read-Write. |
| 0x0009 | Ethernet Address (High): Upper 16-bits of the devices' Ethernet address. Read-Only. |
| 0x000a | Ethernet Address (Low): Lower 16-bits of the devices' Ethernet address. Read-Only. |
| 0x000b | IP Address: IP address assigned to the device. Read-Only if DHCP is enabled, Read-Write if DHCP is disabled. |

-continued

| Offset (Hex) | Description |
| --- | --- |
| 0x000c | IP Mask: IP netmask assigned to the device. Read-Only if DHCP is enabled, Read-Write if DHCP is disabled. |
| 0x000d | UDP Port: UDP port assigned to the device. Read-Write. |
| 0x000e | Default Gateway: Default gateway assigned to the device. Read-Only if DHCP is enabled, Read-Write is DHCP is disabled. |
| 0x000f | SYNACK_TIMEOUT: Amount of time to wait before retransmitting a SYNACK. Read-Write. |
| 0x0010 | Broadcast Enable: Indicates if broadcast TNP datagrams should be processed or discarded. Read-Write. This bit is initially 1, meaning that broadcasts are enabled. If a 0 is written to this bit, a timer BCASTEN_TIMEOUT will automatically be started. When this timer expires, this bit will automatically be set to 1 again. |
| 0x0011 | BCASTEN_TIMEOUT: Specifies the amount of time until the broadcast enable bit is re-enabled after is has been disabled. Read-Write. |
| 0x0012 | Announce Enable: Indicates if a broadcast TNP datagram should be periodically sent out announcing the presence of the client on the network. Like Broadcast Enable, this bit will automatically be re-enabled by the ANNOUNCE_REENABLE_TIMER. ANNOUNCE_PERIOD: Indicates the period at which announcement should be sent out onto the network. A value of zero indicates that announcements should never be sent. Read-Write. Announce UDP Port: The destination UDP port number to be used for announcement datagrams. Read-Write.c ANNOUNCE_REENABLE_TIMER: The amount of time before Announce Enable should be re-enabled. Read-Write. |

FIG. 3E is a table illustrating an example TNP Peer Capability Structure. Multiple instances of the TNP Peer Capability Structure may exist if the devices supports more than one simultaneously connected peer.

When a client is initially powered on or attached to a network, it may wish to establish a connection with a host. Because a host initiates a connection requests, there are multiple mechanisms in place to help a client to be found and connected to by a host, as described in step 152.

In some embodiments, Broadcast Discovery of step 152 involves a host periodically sending out a broadcast onto the network searching for clients. A TNP datagram 202 broadcast onto the network will contain a message to End Point Zero containing a Configuration Read Request operation to address 0x0000. Each client on the network that receives this request will send a Configuration Read Return message back to the host. Hence, by periodically repeating this process, the host will eventually collect a list of all clients on the network.

When processing broadcast requests, clients may choose to wait a random amount of time before transmitting the response. This will ensure that a response storm does not hit the network at once from a large number of clients.

Once a client has been discovered by a host, the Broadcast Enable bit in the TNP Capability Structure should be disabled to prevent it from responding to future broadcasts. This bit is periodically re-disabled to prevent it from being re-enabled by the BCASTEN_TIMEOUT timer. The purpose of the timer is to allow the device to be rediscovered if the host that disabled the Broadcast Enable bit disappears from the network unexpectedly.

In some embodiments, Broadcast Discovery of step 152 involves the client periodically sending out a broadcast onto the network to announce its presence. The broadcast is a TNP datagram 202 with a message to End Point Zero with an OpCode of Announce, and the remainder of the message being identical to a Configuration Read Return to address 0x0000 and a length of 4 words.

In some embodiments, Unicast Discovery of step 152 involves the client periodically sending an announcement message to a particular host. The identity of the host already is known to the client through some other means such as a smart card, or other form of non-volatile storage.

Some network devices are required to implement the Address Resolution Protocol ("ARP") to translate IP addresses to Ethernet (or other L2) addresses. A typical ARP implementation has two components: Response and Request. The response component will listen to the network for ARP requests and send a response back. The request component will send requests onto the network and listen on the network for a response.

The client may be simplified by only implementing the response component of ARP, and not the request component. In such a case, the client will be limited in that it will not be able to send packets to IP addresses from which a packet was net recently received. Because the host will normally initiate a connection to the client, the client will know the Ethernet address of the host before sending it a response.

Figure 4:
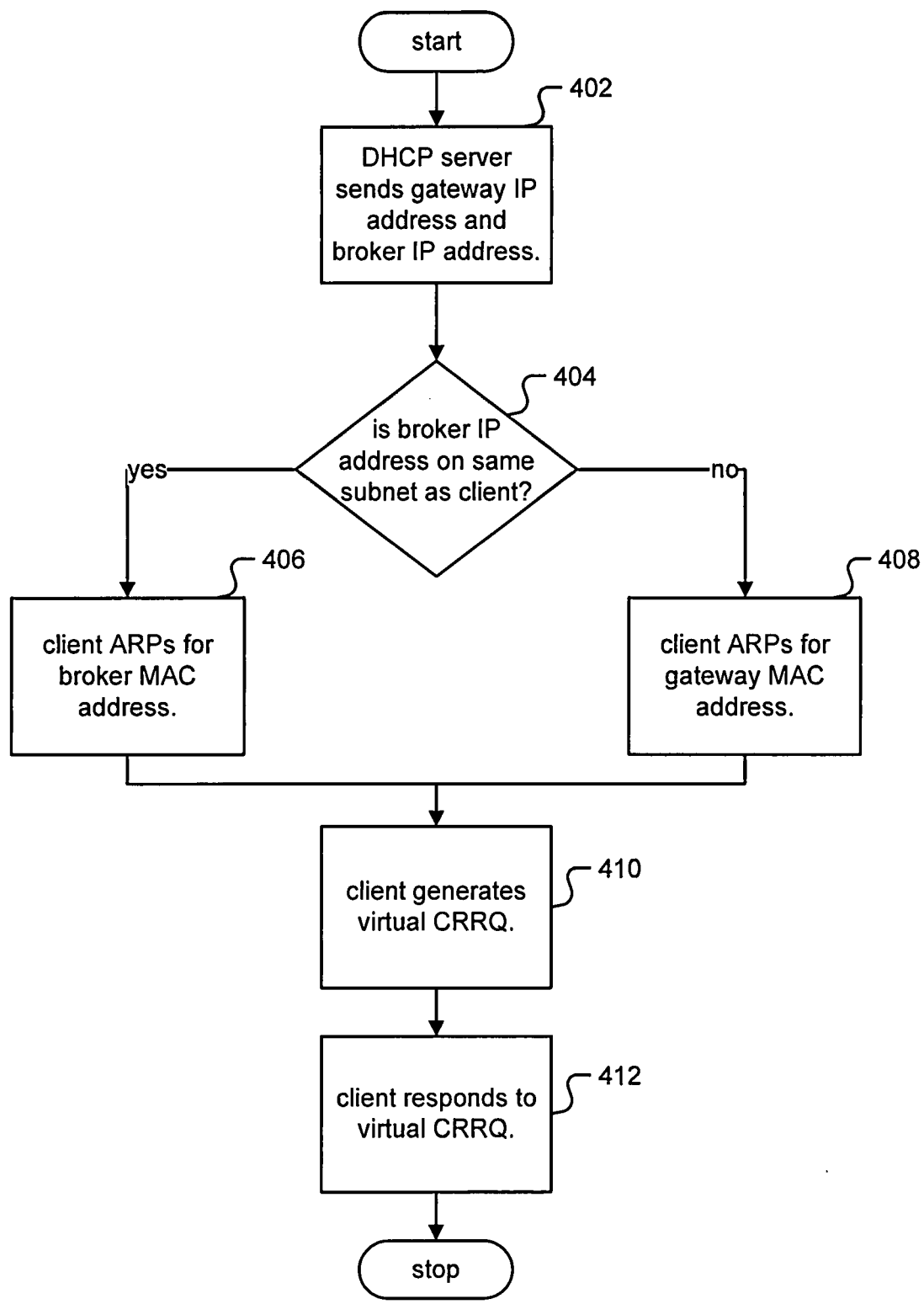
FIG. 4 is a flowchart illustrating an embodiment of a process for the DHCP Discovery Method.

FIG. 4 is a flowchart illustrating an embodiment of a process for the DHCP Discovery Method. The process may be implemented in thin client 102, when a DHCP server is used in the system of FIG. 1, and the DHCP server has the capability and been configured to send the IP address of broker 106. In some embodiments, the process of FIG. 4 is included in 152 of FIG. 1B.

In step 402, the DHCP server responds to the DHCP request of thin client 102 by sending the IP addresses of both the network gateway and the broker 106. If it is determined at step 404 that the IP address of broker 106 is on the same subnet as the thin client 102, then control is transferred to step 406. If it is determined at step 404 that the IP address of broker 106 is not on the same subnet as the thin client 102, then control is transferred to step 408.

In step 406, the thin client 102 may use ARP to request the medium access control ("MAC") address of broker 106. In step 408, the thin client 102 uses ARP to request the MAC address of the network gateway. In step 410, the thin client 102 uses the MAC address from step 406 or step 408 to generate a virtual CRRQ. In step 412, the thin client 102 responds to the virtual CRRQ of step 410, in a manner similar to that used in the Broadcast Discovery or Unicast Discovery methods.

Figure 5A:
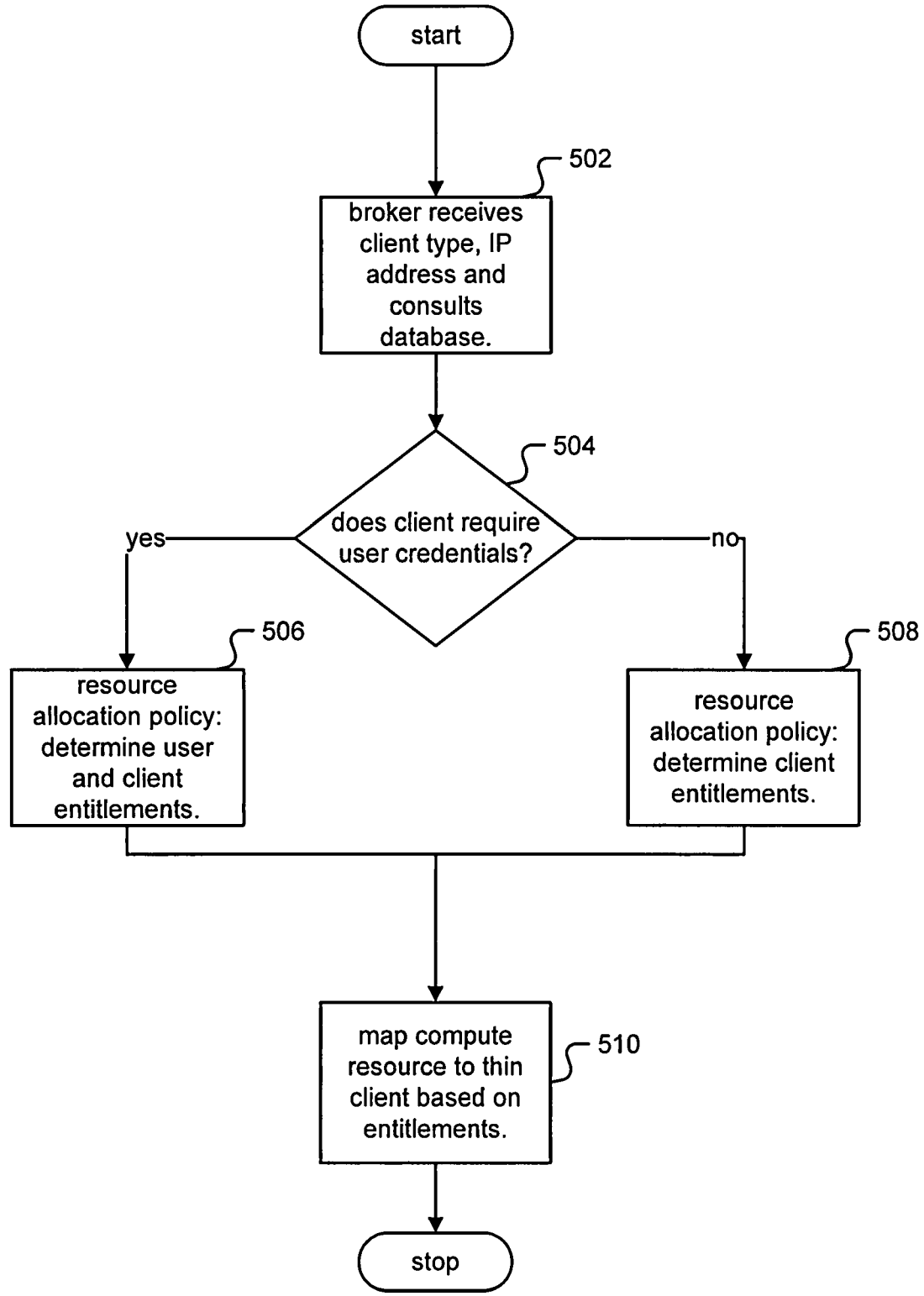
FIG. 5A is a flowchart illustrating an embodiment of a process for determining entitlements for a user session.

FIG. 5A is a flowchart illustrating an embodiment of a process for determining entitlements for a user session. Throughout this specification, "entitlements" refer to a list of compute resources that the user of thin client 102 is entitled to. This process may be implemented in broker 106. In some embodiments, the process of FIG. 5A is included in 154 of FIG. 1B.

In step 502, the broker 106 receives the type of thin client 102. Throughout this specification, a thin client "type" refers to the actual genre of device used as a thin client 102. Three examples of a thin client type are a keyboard/video/mouse terminal, a voice over IP (VoIP) phone, or a network printer. The broker 106 also receives the IP address of thin client 102. The broker 106 then consults a local or remote database based on the type and IP address of thin client 102.

If it is determined in step 504 that the database query result requires user credentials of the current user on thin client 102, then control is passed to step 506. If it is determined in step 504 that the database query result does not require user credentials of the current user on thin client 102, then control is passed to step 508.

In step 506, the broker 106 then determines the user and client entitlements based on user credentials gathered at the thin client 102. To allow a thin client 102 of low complexity and cost, the broker 106 may render the remote access user interface (RAUI) for gathering user credentials at thin client 102. In some embodiments, the broker 106 may use the thin client 102 information gathered and consult a local or remote database to map a physical location to thin client 102. In some embodiments, the broker 106 may use the user information gathered and consult a local or remote database to determine a list of active sessions for the user. A list of the compute resources is determined for selection, and throughout this specification this is called the resource allocation policy. In some embodiments, the user may be presented with the full or partial list for selection. In some embodiments, a compute resource may be autoselected without the user's assistance.

In step 508, the broker 106 determines client entitlements based on credentials gathered at the thin client 102 in step 502. In some embodiments, the broker 106 may use the thin client 102 information gathered and consult a local or remote database to map a physical location to thin client 102. A list of the compute resources or resource allocation policy is determined for selection. In some embodiments, the user may be presented with the full or partial list for selection, by the broker 106 rendering a screen with the list and then monitoring thin client 102 for keyboard, mouse or input events. In some embodiments, a compute resource may be autoselected without the user's assistance. In step 510, the compute resource 104 is selected and assigned for mapping to the thin client 102.

Figure 5B:
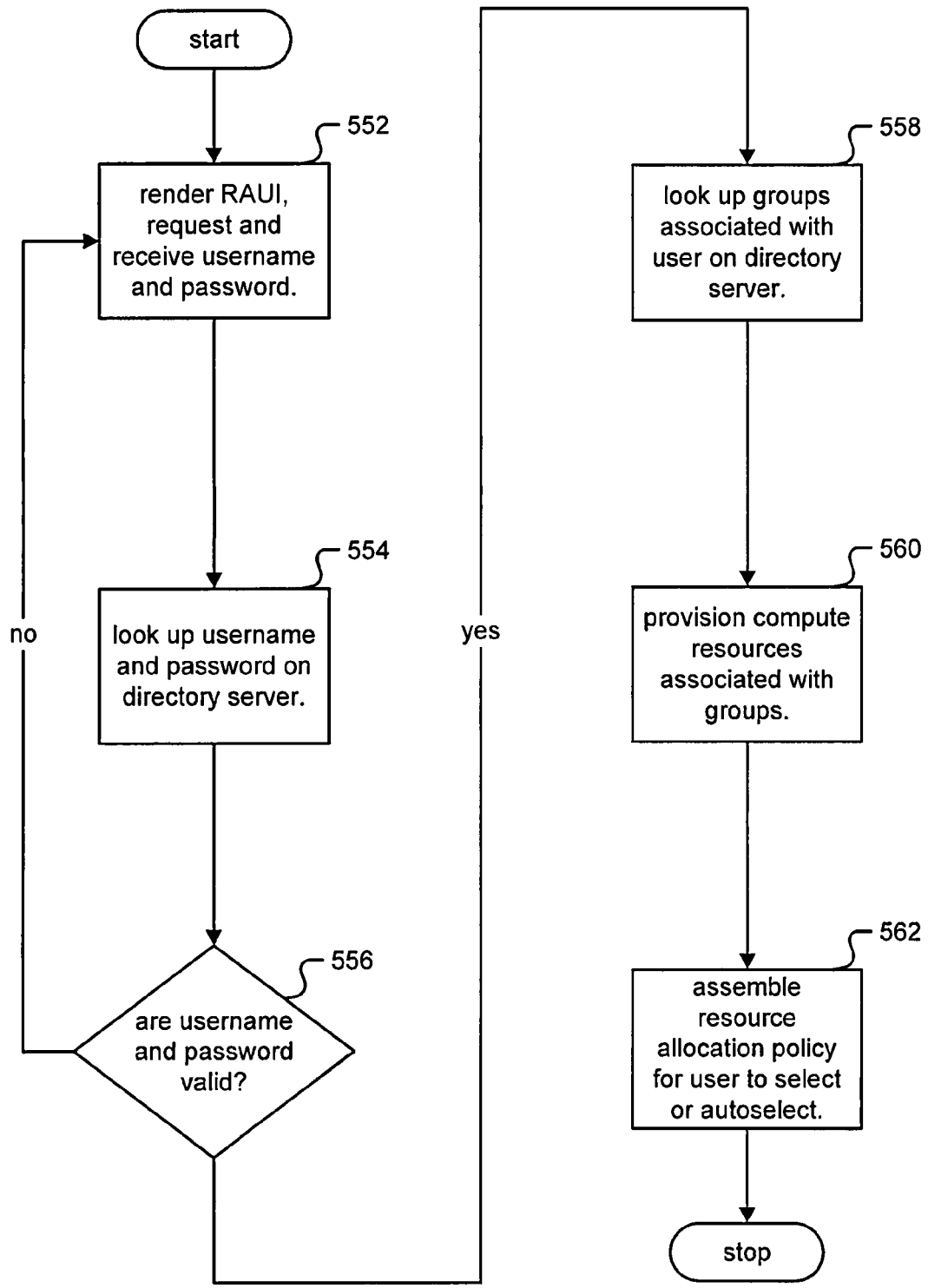
FIG. 5B is a flowchart illustrating an embodiment of a process for determining user entitlements for a user session.

FIG. 5B is a flowchart illustrating an embodiment of a process for determining user entitlements for a user session. This process may be implemented in broker 106. In some embodiments, the process of FIG. 5B is included in 506 of FIG. 5A.

In step 552, the broker 106 renders the RAUI as a bitmap to include a window for requesting user credentials, including a username and a password. This rendered bitmap is sent over TNP to the thin client 102. The thin client 102 then sends the keyboard, mouse or other input device events that contain the user credentials back to broker 106.

In step 554, the broker 106 then consults a special database called a directory server, local or remote, with the user credentials. In some embodiments, a Microsoft Active Directory Server is used for the directory server. If it is determined in step 556 that the user credentials are valid, then control is transferred to step 558. If it is determined in step 556 that the user credentials are invalid or not known, then control is transferred back to step 552 to repeat the request.

In step 558, the directory server is consulted with the valid user credential to look up all groups associated with the user. In step 560, a local or remote database is used to provision resources available to those groups, for example cross-referencing the groups associated with the user with a list of compute resources available to those groups. In step 562, the resource allocation policy is assembled from the database query from step 560, for either the user or broker 106 to select from.

Figure 6:
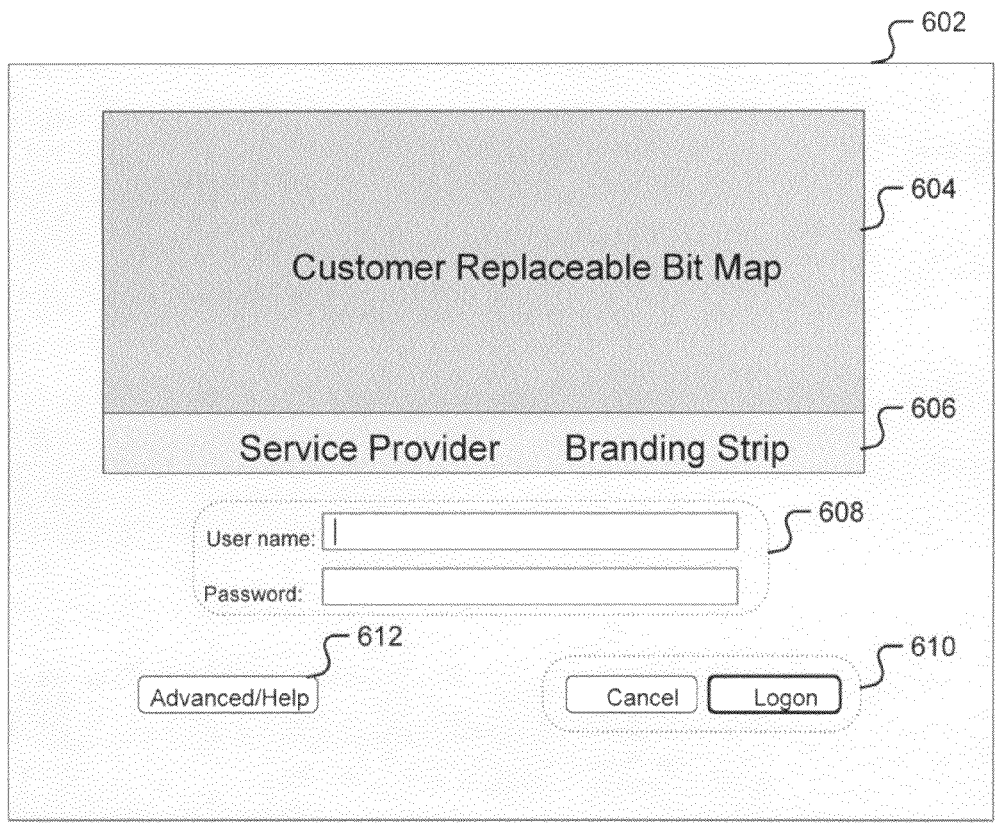
FIG. 6 is a diagram illustrating an example of a remote access user interface screen.

FIG. 6 is a diagram illustrating an example of a remote access user interface screen. To allow a thin client 102 of low complexity and cost, the thin client 102 may require the broker 106 to perform all rendering of the RAUI bitmap. In some embodiments, this is the RAUI bitmap of step 552.

The RAUI bitmap 602 is comprised of:

a thin client system administrator brand bitmap 604, to identify the thin client system or its administrator;

a thin client system architecture or service provider bitmap 606, to identify the thin client service provider;

an input frame for user credentials 608, including username, password, and any other applicable credentials such as workgroup or user domain;

a confirmation frame 610, that would allow the user to logon with the credentials input in 608, or alternately cancel and clear the input frame 608; and an advanced button 612, to allow for more advanced or customizable options, such as the ability to allow a user to self help, including one or more of: requesting a temporal rollback of the state of compute resource 104; filing a trouble ticket with the thin client system administrator for assistance; sending an escalating request to the currently connected compute resource 104; and quarantining the existing compute resource.

The remote access user interface screen may be customizable by the system administrator using skins, application program interfaces (APIs), and scripts.

Figure 7:
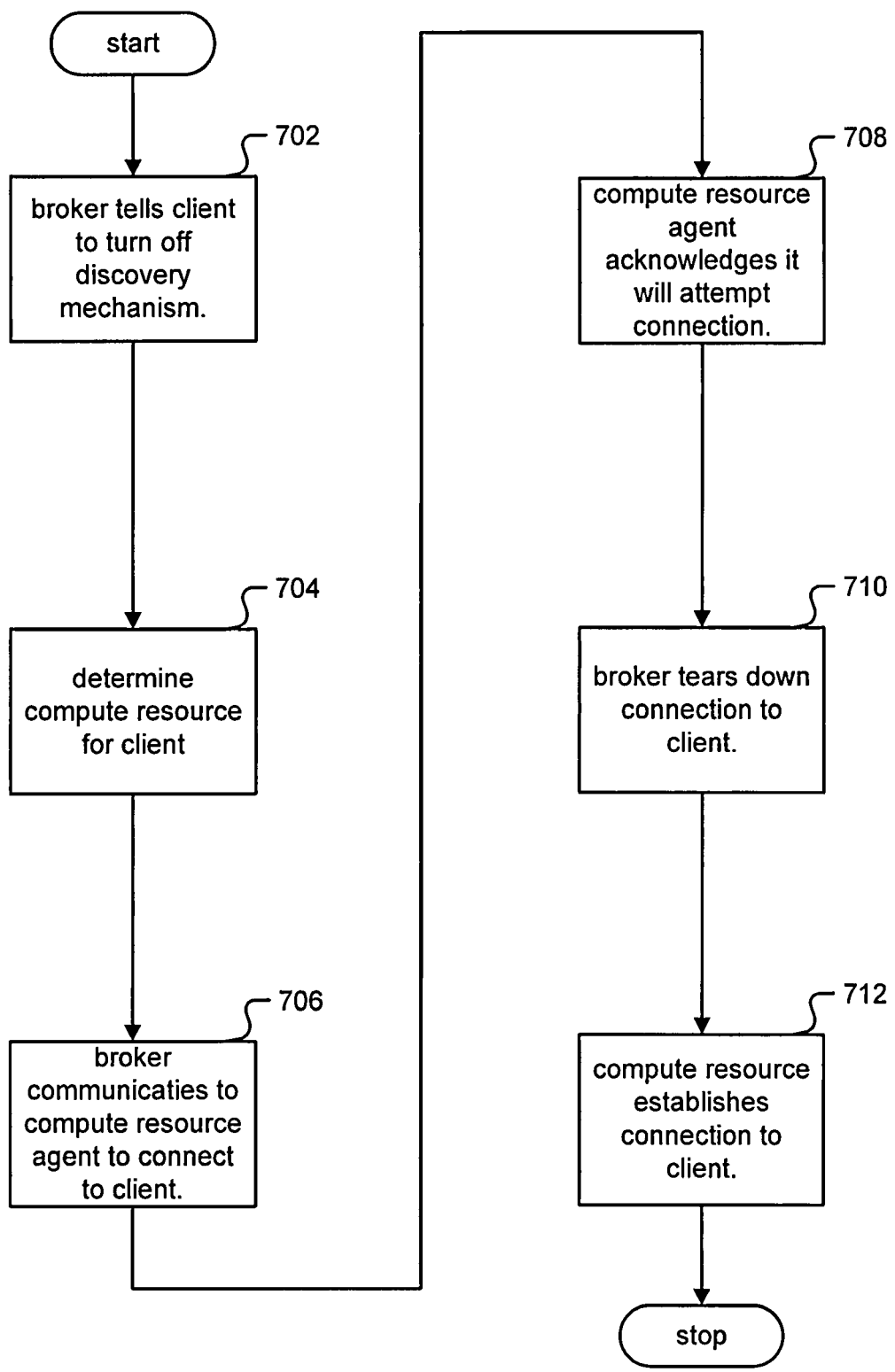
FIG. 7 is a flowchart illustrating an embodiment of a process for broker hand off.

FIG. 7 is a flowchart illustrating an embodiment of a process for broker hand off. This process may be implemented in broker 106 and compute resource 104. In some embodiments, the process of FIG. 7 is included in 156 of FIG. 1B.

In step 702, after discovery in step 152, the broker 106 tells the thin client 102 to turn off the discovery mechanism to prevent a rediscovery process. In step 704, the broker 106 determines the compute resource 104 for thin client 102. In some embodiments, the process of FIG. 5A is included in this step 704.

In step 706, the broker 106 communicates to a compute resource agent running on compute resource 104, to indicate the thin client 102 is ready to connect to compute resource 104. The compute resource agent on compute resource 104 acknowledges it will attempt a connection.

In step 710, the broker 106 may tear down its connection to thin client 102. To allow a thin client 102 of low complexity and cost, the thin client 102 may not have the capability to originate any network connections and may only permit one connection at a time. Thus the broker 106 and compute resource 104 may not be able to both connect to the thin client 102 at the same time. In step 712, the compute resource agent on compute resource 104 establishes its connection to thin client 102 and hand off is complete.

Figure 8:
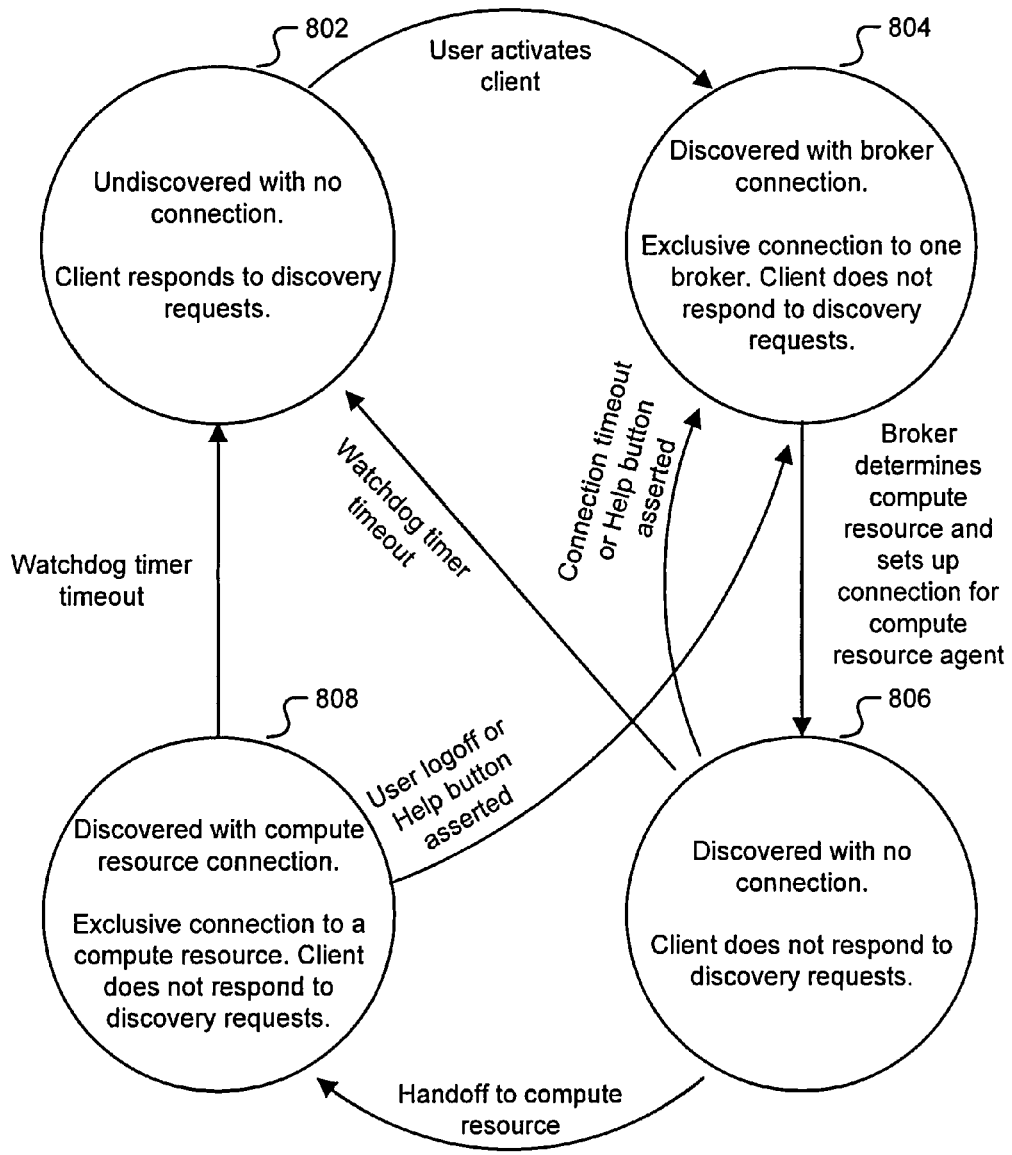
FIG. 8 is a state diagram illustrating an embodiment of a process for broker hand off and connection maintenance.

FIG. 8 is a state diagram illustrating an embodiment of a process for broker hand off and connection maintenance. This process may be implemented in broker 106 and compute resource 104. In some embodiments, the process of FIG. 8 is included in step 156 of FIG. 1B.

In state 802, the thin client 102 is considered Undiscovered with No current connection. To allow a thin client 102 of low complexity and cost, the thin client 102 may not have the capability to originate any network connections or discover the network autonomously. In this state 802, the thin client 102 will respond to any discovery requests or connection requests.

State transition from state 802 to state 804 occurs if the user of thin client 102 activates the thin client 102, asserting that a session should begin, and commences thin client discovery. In some embodiments, this state transition between state 802 and 804 is included in step 152 of FIG. 1B.

In state 804, the thin client 102 is considered Discovered with its current connection to broker 106. To allow a thin client 102 of low complexity and cost, the thin client 102 may only permit one connection at a time. In this state 804, thin client 102 does not respond to any further discovery requests, and does not process any further connection requests because of its connection to broker 106.

State transition from state 804 to state 806 occurs if the broker 106 determines the resource allocation policy for thin client 102 and determines a possible mapped compute resource 104 for the operational connection. In some embodiments, this state transition between state 804 and 806 is included in step 154 of FIG. 1B.

In state 806, the thin client 102 is considered Discovered with no current connection. In this state 806, thin client 102 does not respond to any further discovery requests, but will process any connection requests, the most likely being a connection request from mapped compute resource 104.

State transition from state 806 to state 804 occurs if a connection timer reaches zero. This may happen if the mapped compute resource 104 cannot or will not commence the operational connection to thin client 102 in time. State transition from state 806 to state 804 also occurs if the Help button is asserted, indicating that the user of thin client 102 has an issue with the discovery process.

State transition from state 806 to state 808 occurs if the handoff to compute resource 104 is completed successfully. In some embodiments, this state transition between state 806 to state 808 is included in step 156 of FIG. 1B.

State transition from state 806 to state 802 occurs if a special watchdog timer reaches zero. This may happen if the mapped compute resource 104 is not functioning properly and the broker 106 is also not functioning properly.

In state 808, the thin client 102 is considered Discovered with a current connection to mapped compute resource 104. In this state 808, thin client 102 does not respond to any further discovery requests, and does not process any further connection requests because of its connection to mapped compute resource 104.

State transition from state 808 to state 804 occurs if the user of thin client 102 logs off the current operational connection, to allow the thin client 102 to return to a Discovered state for the next user. State transition from state 808 to state 804 also occurs if the Help button is asserted, indicating that the user of thin client 102 has an issue with the discovery process.

State transition from state 808 to state 802 occurs if a special watchdog timer reaches zero. This may happen if the mapped compute resource 104 is not functioning properly and the broker 106 is also not functioning properly.

Figure 9:
FIG. 9 is a diagram illustrating an example of a rendered Help button user interface screen.

FIG. 9 is a diagram illustrating an example of a rendered Help button user interface screen. To allow a thin client 102 of low complexity and cost, the thin client 102 may require the broker 106 to perform all rendering of the Help button user interface bitmap.

The Help button user interface bitmap 902 may be comprised of:
an option to produce another session 904, in which case the current session would be abandoned;
an option to rollback the current session 906, with a variable or fixed time to rollback, for example twenty-four hours;
an option to contact the system administrator 908, for assistance or for quarantining; and
an option to save the current session's state 910, so that the user can take the state with them via a nonvolatile memory card, for example a USB pen drive.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A broker, including: an interface coupled to a network; a processor; and a memory coupled with the processor, wherein the memory is configured to provide the processor with instructions which when executed cause the processor to: originate a discovery request probing for undiscovered thin client devices that do not have a capability to originate any network connections or discover the network autonomously; discover a thin client by receiving a response to the discovery request; determine a resource to allocate for the thin client; map the thin client to the resource; and request that a connection be established between the resource and the thin client wherein the processor is further configured to: render a resource allocation user interface; and transmit the rendered resource allocation user interface to the thin client.

2. A broker as recited in claim 1, wherein the connection is initiated by the resource.

3. A broker as recited in claim 1, wherein the resource is a virtual machine.

4. A broker as recited in claim 1, wherein the response is directed to an IP address of the broker.

5. A broker as recited in claim 1, wherein the processor is further configured to determine a thin client IP address and a thin client type from the response to the discovery request.

6. A broker as recited in claim 1, wherein the resource allocation user interface includes user authentication information.

7. A broker as recited in claim 6, wherein mapping the thin client to the resource is based on the user authentication information.

8. A broker as recited in claim 1, wherein the discovery request is sent to a range of IP addresses using unicast packets.

9. A broker as recited in claim 1, wherein the discovery request is sent to a local LAN segment using a broadcast packet.

10. A broker as recited in claim 1, wherein the discovery request is sent to a remote LAN segment using a broadcast packet routed by a router.

11. A broker as recited in claim 1, wherein the discovery request is sent to a remote LAN segment using a broadcast packet assisted by a thin client on the remote LAN segment.

12. A broker as recited in claim 1, wherein the broker originates the discovery request using a DHCP server by supplying an IP address for the broker in a DHCP response, and the thin client virtually generates the discovery response using the DHCP response.

13. A broker as recited in claim 12, wherein the thin client uses ARP and the DHCP gateway subnet mask to resolve the broker MAC address.

14. A broker as recited in claim 12, wherein the thin client uses ARP and the DHCP gateway subnet mask to resolve the DHCP gateway MAC address.

15. A broker as recited in claim 1, wherein mapping the thin client to the resource is based on a thin client address, wherein the thin client address includes one or combination of: a thin client IP address; a thin client MAC address; and a thin client serial number.

16. A broker as recited in claim 1, wherein mapping the thin client to the resource is based on the thin client type.

17. A broker as recited in claim 1, wherein the processor is further configured to receive a user request for assistance.

18. broker as recited in claim 1, wherein the processor is further configured to receive a user request for assistance using a Help button on the thin client.

19. A broker as recited in claim 1, wherein each thin client has no central processing unit.

20. A method, including: originating a discovery request probing for undiscovered thin client devices that do not have a capability to originate any network connections or discover a network autonomously; discovering a thin client by receiving a response to the discovery request; determining a resource to allocate for the thin client; mapping the thin client to the resource; and requesting that a connection be established between the resource and the thin client; and further rendering a resource allocation user interface; and transmit the rendered resource allocation user interface to the thin client.

21. A method as recited in claim 20, wherein the connection is initiated by the resource.

22. A method as recited in claim 20, wherein the resource is a virtual machine.

23. A method as recited in claim 20, where each thin client has no central processing unit.

24. A thin client to be connected to a resource, including: a physical network interface, wherein the interface is configured to: receive a discovery request probing for undiscovered thin client devices that do not have a capability to originate any network connections or discover the network autonomously; send a response to a discovery request, wherein the response is directed to a broker that determines the resource to allocate for the thin client and maps the thin client to the resource; and receives a connection from the resource, wherein the connection is requested by the broker to be established between the resource and the thin client; wherein a processor is further configured to: render a resource allocation user interface; and transmit the rendered resource allocation user interface to the thin client.

25. A thin client as recited in claim 24, wherein the connection is initiated by the resource.

26. A thin client as recited in claim 24, wherein the resource is a virtual machine.

27. A thin client as recited in claim 24, wherein the thin client does not include a central processing unit.

* * * * *